(12) United States Patent
Yamamoto et al.

(10) Patent No.: US 6,888,581 B2
(45) Date of Patent: May 3, 2005

(54) DIGITAL BROADCAST RECEIVER AND CONTROL METHOD THEREOF

(75) Inventors: Manabu Yamamoto, Osaka (JP); Kazuhiko Tani, Osaka (JP); Yasuhiro Inui, Osaka (JP); Kazuhide Ishihara, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 499 days.

(21) Appl. No.: 10/142,182

(22) Filed: May 9, 2002

(65) Prior Publication Data

US 2002/0176026 A1 Nov. 28, 2002

(30) Foreign Application Priority Data

May 15, 2001 (JP) ...................................... P 2001-144850

(51) Int. Cl.[7] ................................................ H04N 5/50
(52) U.S. Cl. ........................ 348/731; 348/555; 348/570
(58) Field of Search ................................ 348/731, 732, 348/725, 555, 556, 570, 569, 706, 705; H04N 5/50

(56) References Cited

U.S. PATENT DOCUMENTS

| | | | | |
|---|---|---|---|---|
| 5,231,494 A | * | 7/1993 | Wachob | 348/385.1 |
| 5,751,722 A | * | 5/1998 | Maekawa | 370/522 |
| 6,084,645 A | * | 7/2000 | Park et al. | 348/734 |
| 6,104,436 A | * | 8/2000 | Lee | 348/563 |
| 2002/0104103 A1 | * | 8/2002 | Takagi et al. | 725/151 |

FOREIGN PATENT DOCUMENTS

JP 11-355225 12/1999 ............ H04H/1/00

* cited by examiner

Primary Examiner—Michael H. Lee
(74) Attorney, Agent, or Firm—Osha & May L.L.P.

(57) ABSTRACT

In a digital broadcast receiver 10, an MPU 26 has a configuration for detecting the number of subchannels and the numbers of the subchannels which a received main channel has from control data received and switching to a subchannel with the minimum number when the number of subchannels changes and switching to a subchannel with the minimum number of the residual subchannels when the numbers of the subchannels received run out and displaying the numbers of the received main channel and the subchannel on a display 25.

6 Claims, 2 Drawing Sheets

DIGITAL BROADCAST RECEIVER AND CONTROL METHOD THEREOF

BACKGROUND OF THE INVENTION

1. Field of the Invention

The present invention relates to a digital broadcast receiver and a control method thereof.

2. Description of the Related Art

As a television broadcast shifts from analog to digital, kinds of broadcast also diversify, and an HD (High Definition) broadcast by using one channel of band or an SD (Standard Definition) broadcast by dividing one channel of band into plural channels and using the channels is broadcast at any time. In that case, a broadcast to be received is determined by specifying a main channel indicating a broadcast station and subchannels indicating broadcast programs. Then, when the HD broadcast is completed and switches to the SD broadcast with the same channel, it becomes necessary for a user to specify a subchannel of the SD broadcast naturally.

As this specifying method, a digital broadcast receiver and a control method thereof in which switching to a predetermined subchannel preset by a maker or a user is performed in the case of switching from a one-channel broadcast such as an HD broadcast to a multi-channel broadcast such as an SD broadcast are disclosed in JP-A-11-355225.

However, in the digital broadcast receiver and the control method described in JP-A-11-355225, switching to the preset predetermined subchannel is automatically performed in the case of switching from the one-channel broadcast to the multi-channel broadcast, but a broadcast breaks when there is no broadcast of the predetermined subchannel.

Also, even when a predetermined subchannel exists and switching can be automatically performed in the case of switching from the one-channel broadcast to the multi-channel broadcast, a broadcast breaks when a broadcast of the predetermined subchannel is then completed and it becomes a broadcast of only subchannels of other numbers. Similarly, the case of switching from the multi-channel broadcast to the one-channel broadcast is not described, and when a subchannel of the switched one-channel broadcast is not a predetermined subchannel preset, a broadcast breaks. In such a case, a user must again select the subchannel and usability was bad.

SUMMARY OF THE INVENTION

In view of the problem, an object of the invention is to provide an easy-to-use digital broadcast receiver in which a broadcast does not break even when a user does not select a channel. Also, another object is to provide a control method of the digital broadcast receiver.

In order to achieve the objects, a control method according to the invention is characterized in that there is a control method for performing automatic switching of a subchannel by an MPU when a subchannel of a received main channel changes in a digital broadcast receiver for receiving a broadcast by operating an operation part to specify a main channel indicating a broadcast station and subchannels indicating broadcast programs, and the MPU comprises the steps of detecting the number of subchannels and the numbers of the subchannels which the received main channel has from control data received, switching to a subchannel with the minimum number when the number of subchannels changes, switching to a subchannel with the minimum number of the residual subchannels when the numbers of the subchannels received run out, and displaying the numbers of the received main channel and the subchannel on a display.

As a result of this, even when the number of subchannels or the number of the subchannel changes during broadcast reception, for example, it switches from an HD broadcast to an SD broadcast, a broadcast does not break and usability improves. Also, since there is a high possibility that the subchannel with the minimum number will be a main program of a broadcast station, a user can view the main program without a particular operation.

Also, a control method according to the invention is characterized by a control method in a digital broadcast receiver for receiving a broadcast by specifying a main channel indicating a broadcast station and subchannels indicating broadcast programs, comprising the steps of detecting the number of subchannels which a received main channel has, and switching to a subchannel with the minimum number when the number of subchannels changes.

As a result of this, even when the broadcast programs increase or decrease during broadcast reception and the number of subchannels changes, a broadcast does not break and usability improves. Also, since there is a high possibility that the subchannel with the minimum number will be a main program of a broadcast station, a user can view the main program without a particular operation.

Also, a control method according to the invention is characterized by a control method in a digital broadcast receiver for receiving a broadcast by specifying a main channel indicating a broadcast station and subchannels indicating broadcast programs, comprising the steps of detecting the numbers of the subchannels which a received main channel has, and switching to a subchannel with the minimum number of the residual subchannels when the numbers of the subchannels received run out.

As a result of this, even when the broadcast program on reception ends and the numbers of the subchannels presently on reception run out, a broadcast does not break and usability improves. Also, since there is a high possibility that the subchannel with the minimum number will be a main program of a broadcast station, a user can view the main program without a particular operation.

Also, in the control method, by outputting the numbers of the received main channel and the subchannel in the case of switching to the subchannel with the minimum number, a user can easily check that the channel has been switched.

Also, a digital broadcast receiver according to the invention is characterized by comprising means for performing control by the control method described above.

DETAILED DESCRIPTION OF THE PREFERRED EMBODIMENTS

Now, a description will be given in more detail of preferred embodiments of the invention with reference to the accompanying drawings.

Figure 1:
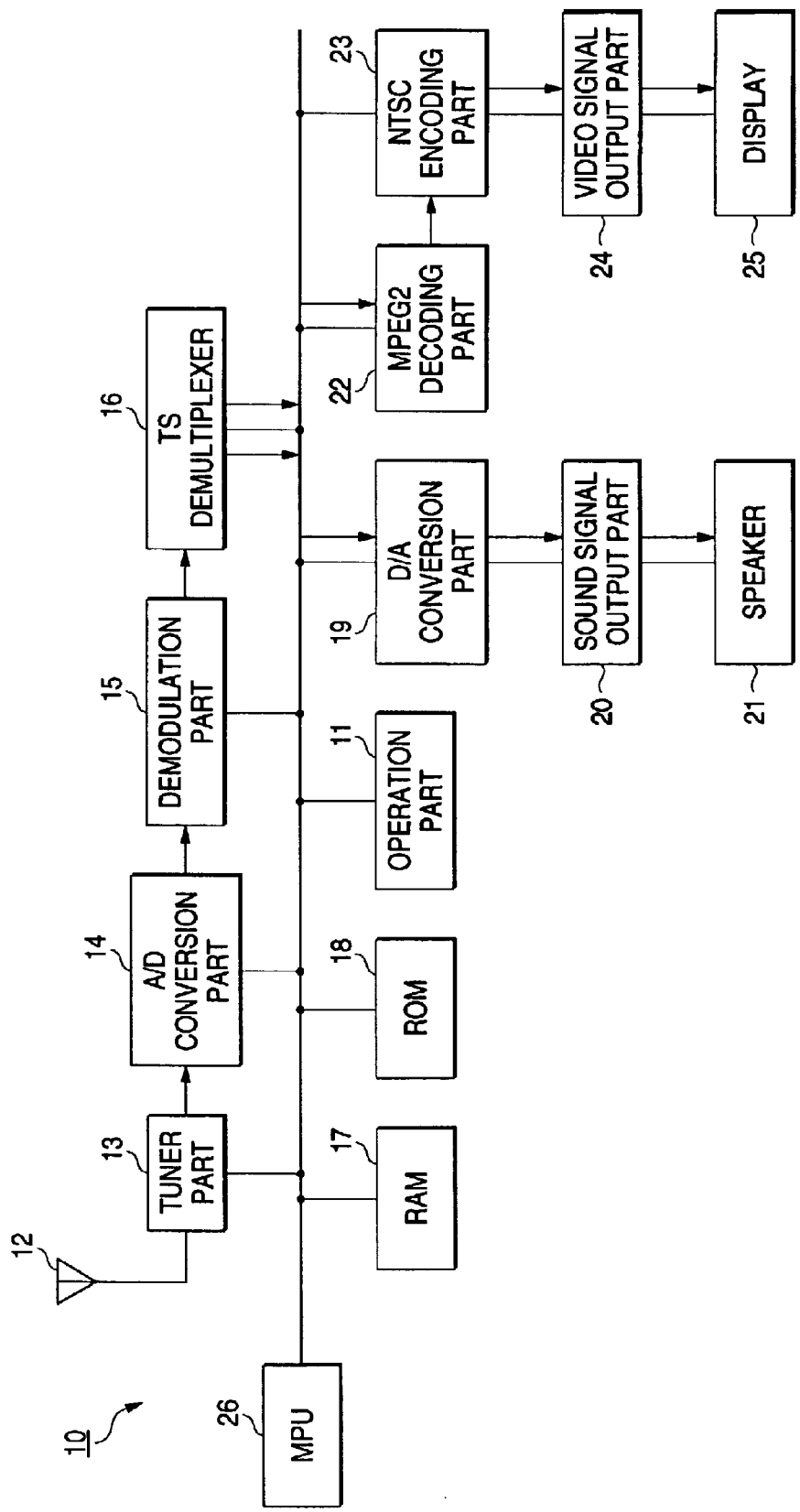
FIG. 1 is a block diagram showing a configuration of a digital broadcast receiver of the present invention.

FIG. 1 is a block diagram showing a configuration of a digital broadcast receiver 10. Numeral 11 is an operation part in which a user performs an on-off operation of a power source or performs various operations such as a channel selection. Incidentally, the operation part 11 may be provided as remote control capable of remote operation. Numeral 12 is an antenna part for receiving digital broadcast waves, and numeral 13 is a tuner part for selecting a broadcast of a desired channel from the broadcast waves received by the antenna part 12, and numeral 14 is an A/D conversion part for converting an output wave from the tuner part 13 into a digital signal, and numeral 15 is a demodulation part for demodulating the output to data.

Also, numeral 16 is a TS demultiplexer for separating and outputting the data demodulated by the demodulation part 15 every kind, and numeral 17 is RAM for storing the separated data, and numeral 18 is ROM for storing information necessary for an operation of the digital broadcast receiver 10. Numeral 19 is a D/A conversion part for converting sound data of the data stored in the RAM 17 into analog, and numeral 20 is a sound signal output part for outputting the sound data converted into analog by the D/A conversion part 19, and numeral 21 is a speaker for issuing sound.

Also, numeral 22 is an MPEG2 decoding part for decoding video data of the data stored in the RAM 17 into video data before compression, and numeral 23 is an NTSC encoding part for decoding the decoded video data into an NTSC television signal, and numeral 24 is a video signal output part for outputting the NTSC television signal, and numeral 25 is a display for displaying video. Then, numeral 26 is an MPU for controlling an operation of the digital broadcast receiver 10 or detecting the number of subchannels and the numbers of the subchannels which a received main channel has.

Next, an operation at the time when the digital broadcast receiver 10 receives a broadcast will be described. Digital broadcast waves sent are first received by the antenna part 12. When the operation part 11 operates a channel selection, the tuner part 13 performs switching of a transponder received. The received digital broadcast waves are digitized by the A/D conversion part 14 and data is demodulated by the demodulation part 15.

Originally, a digital signal is sent from the broadcast station in a form of a TS (Transport Stream) packet. The TS packet comprises control data including video data, sound data, channel data (data about a main channel and a subchannel), etc. and this control data is separated and outputted by the TS demultiplexer 16 and is stored in the RAM 17. Then, sound data read from the RAM 17 is converted into analog by the D/A conversion part 19, and sound is issued from the speaker 21 through the sound signal output part 20.

Also, video data read from the RAM 17 is decoded into video data before compression by the MPEG2 (Motion Picture Experts Group) decoding part 22 and is decoded into an NTSC television signal by the NTSC encoding part 23 and video is displayed on the display 25 through the video signal output part 24.

Figure 2:
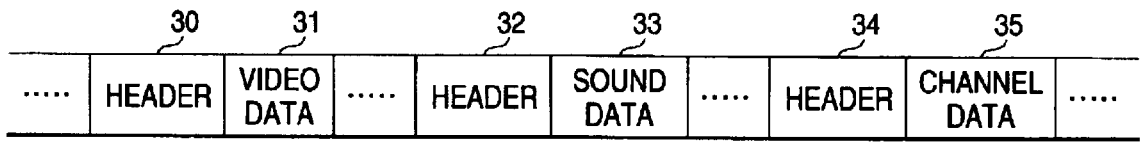
FIG. 2 is a conceptual diagram showing a configuration of a TS packet used in the invention.

Incidentally, in the TS packet, by adding identification data to a header, the control data including video data, sound data, channel data, etc. can be freely combined and transmitted. FIG. 2 is a conceptual diagram showing a configuration of the TS packet. Data indicating a size of video for identifying an HD broadcast or an SD broadcast is included in a header 30 for identifying the video data. Then, video data 31 subsequent to the header 30 is formed into identified data having an ID every subchannel.

Also, sound data 33 subsequent to a header 32 for identifying the sound data is formed into identified data having an ID every subchannel. Also, a main channel received, a channel number and an ID every subchannel corresponding to the main channel are included in channel data 35 subsequent to a header 34 for identifying the channel data.

Then, when a subchannel number corresponding to the main channel received is specified from among the channel data 35 by a command from the MPU 26, video data and sound data matching with an ID which the specified subchannel number has are read from among the video data 31 and the sound data 33. As a result of that, video of the specified channel can be displayed on the display 25 and sound can be issued from the speaker 21.

Figure 3:
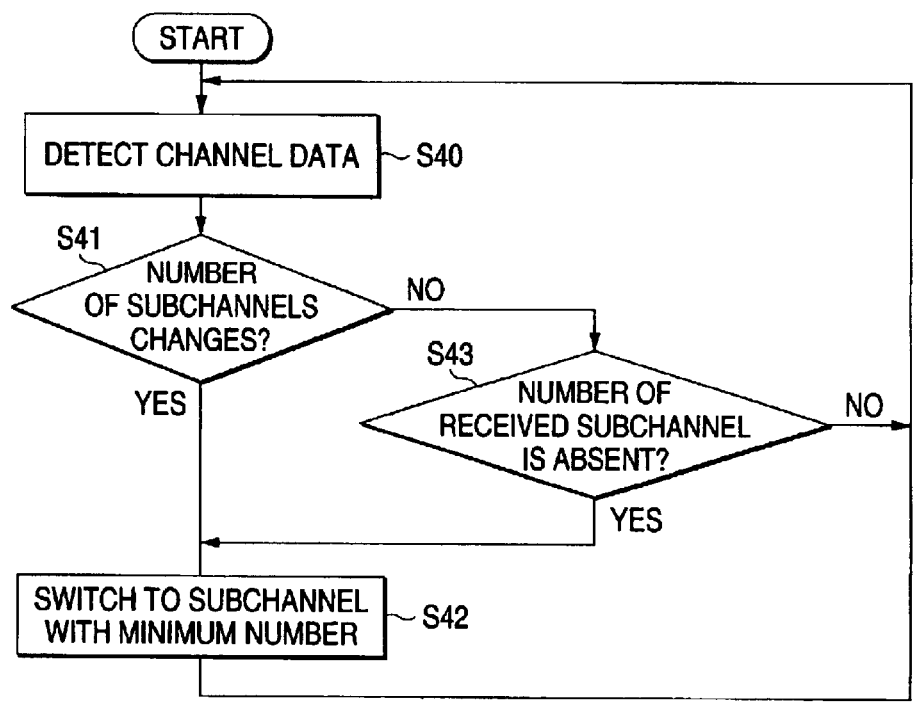
FIG. 3 is a flowchart showing an operation of the digital broadcast receiver of the invention.

Next, a control method about switching of a subchannel in the digital broadcast receiver 10 will be described. FIG. 3 is a flowchart showing an operation of the digital broadcast receiver 10 at the time of automatically switching a subchannel. The digital broadcast receiver 10 which is receiving a digital broadcast detects channel data 35 from a TS packet in step S40. The operation proceeds from step S40 to step S41, and the number of subchannels is calculated and is compared with the number of subchannels calculated at the previous time and it is determined whether or not the number changes.

When it is compared with the previous time and the number of subchannels of this time changes in step S41, the operation proceeds to step S42 and it is switched to a subchannel with the minimum number of the subchannel numbers of this time. Thereafter, the operation returns to step S40.

On the other hand, when it is compared with the previous time and the number of subchannels of this time does not change in step S41, the operation proceeds to step S43 and it is checked whether a number of the presently received subchannel is present or absent among the channel data 35 detected at this time. As a result of that, when the number of the presently received subchannel is absent in step S43, the operation proceeds to step S42 and it is switched to a subchannel with the minimum number of the subchannel numbers detected at this time. Thereafter, the operation returns to step S40. On the other hand, when the number of the presently received subchannel is present in step S43, the operation returns to step S40 without switching the channel.

Figure 4:
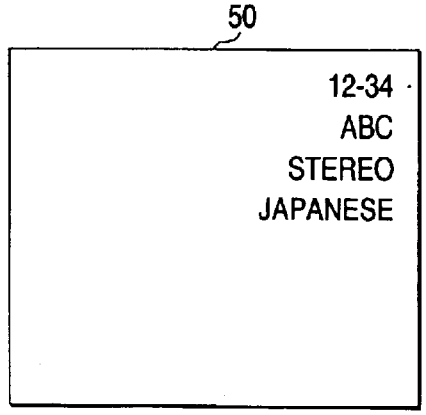
FIG. 4 is a diagram showing an image in which a channel etc. in the digital broadcast receiver of the invention are displayed.

Incidentally, when the numbers of the switched main channel and the subchannel are displayed on the display 25 as shown in an image 50 of FIG. 4 after the subchannel is switched in step S42, a user can easily check that the channel has been switched.

According to such a control method or a digital broadcast receiver having the control method, even when the number of subchannels or the number of the subchannel changes during broadcast reception, a broadcast does not break and usability improves. Also, since there is a high possibility that the subchannel with the minimum number will be a main program of a broadcast station, a user can view the main program without a particular operation.

Next, embodiments at the time of receiving a broadcast using the digital broadcast receiver 10 will be described. In the following embodiments, it is assumed that display of a main channel and a subchannel is separated by "-" and, for example, it is displayed by "10-1" when a main channel is 10 and a subchannel is 1.

<First Embodiment>

A case that a main channel does not change and a subchannel switches from a one-channel broadcast to a multi-channel broadcast, for example, a case that at certain time, an HD broadcast of 10-1 channel ends and switches to an SD broadcast of 10-2, 10-3, 10-4 channels is considered as a first embodiment. An operation of the digital broadcast receiver 10 in this case will be described on the basis of the flowchart shown in FIG. 3.

In step S40, channel data of 10-2, 10-3, 10-4 channels is detected from a TS packet. The operation proceeds from step S40 to step S41, and the number of subchannels is calculated and is compared with the number of subchannels calculated from channel data of the previous 10-1 channel and the number changes from one to three, so that the operation proceeds to step S42. In step S42, it is switched to 10-2 channel having the minimum number of three subchannel numbers.

<Second Embodiment>

A case that a main channel does not change and only a subchannel switches, for example, a case that at certain time, an HD broadcast of 10-1 channel ends and switches to an SD broadcast of only a 10-2 channel is considered as a second embodiment. An operation of the digital broadcast receiver 10 in this case will be described on the basis of the flowchart shown in FIG. 3.

In step S40, channel data of 10-2 channel is detected from a TS packet. The operation proceeds from step S40 to step S41, and the number of subchannels is calculated and is compared with the number of subchannels calculated from channel data of the previous 10-1 channel and the number remains one, so that the operation proceeds to step S43. In step S43, a subchannel number of 10-2 channel detected at this time is different from a subchannel number of the presently received 10-1 channel, so that the operation proceeds to step S42 and it is switched to 10-2 channel.

Incidentally, in the embodiments described above, a digital television in which the digital broadcast receiver is integrated with the speaker 21 and the display 25 has been described, but it may be a digital broadcast receiver such as a digital broadcast tuner or a video device without the speaker 21 and the display 25.

According to a digital broadcast receiver of the invention or a control method thereof, by detecting the number of subchannels and the numbers of the subchannels which a received main channel has from control data received and switching to a subchannel with the minimum number when the number of subchannels changes or switching to a subchannel with the minimum number of the residual subchannels when the numbers of the subchannels received run out and displaying the numbers of the received main channel and the subchannel on a display, even when the number of subchannels or the number of the subchannel changes during broadcast reception, a broadcast does not break and usability improves. Also, since there is a high possibility that the subchannel with the minimum number will be a main program of a broadcast station, a user can view the main program without a particular operation.

Also, according to a digital broadcast receiver of the invention or a control method thereof, by detecting the number of subchannels which a received main channel has and switching to a subchannel with the minimum number when the number of subchannels changes, even when the broadcast programs increase or decrease during broadcast reception and the number of subchannels changes, a broadcast does not break and usability improves. Also, since there is a high possibility that the subchannel with the minimum number will be a main program of a broadcast station, a user can view the main program without a particular operation.

Also, according to a digital broadcast receiver of the invention or a control method thereof, by detecting the numbers of the subchannels which a received main channel has and switching to a subchannel with the minimum number of the residual subchannels when the numbers of the subchannels received run out, even when the broadcast program on reception ends and the numbers of the subchannels presently on reception run out, a broadcast does not break and usability improves. Also, since there is a high possibility that the subchannel with the minimum number will be a main program of a broadcast station, a user can view the main program without a particular operation.

Also, according to a digital broadcast receiver of the invention or a control method thereof, by outputting the numbers of the received main channel and the subchannel in the case of switching to the subchannel with the minimum number, a user can easily check that the channel has been switched.

What is claimed is:

1. A control method for performing automatic switching of a subchannel by an MPU when a subchannel of a received main channel changes in a digital broadcast receiver for receiving a broadcast by operating an operation part to specify a main channel indicating a broadcast station and subchannels indicating broadcast programs, characterized in that the MPU comprises the steps of:

detecting the number of subchannels and the numbers of the subchannels which the received main channel has from control data received;

switching to a subchannel with the minimum number when the number of subchannels changes;

switching to a subchannel with the minimum number of the residual subchannels when the numbers of the subchannels received run out; and displaying the numbers of the received main channel and the subchannel on a display.

2. A control method in a digital broadcast receiver for receiving a broadcast by specifying a main channel indicating a broadcast station and subchannels indicating broadcast programs, comprising the steps of:

detecting the number of subchannels contained in a received main channel; and switching to a subchannel with the minimum number when the number of subchannels changes.

3. A control method in a digital broadcast receiver for receiving a broadcast by specifying a main channel indicating a broadcast station and subchannels indicating broadcast programs, comprising the steps of:

detecting the numbers of the subchannels contained in a received main channel; and switching to a subchannel with the minimum number of the residual subchannels when the numbers of the subchannels received run out.

4. A control method as defined in claim 2, wherein the numbers of the received main channel and the subchannel are outputted in the case of switching to the subchannel with the minimum number.

5. A control method as defined in claim 3, wherein the numbers of the received main channel and the subchannel are outputted in the case of switching to the subchannel with the minimum number.

6. A digital broadcast receiver characterized by comprising means for performing control by a control method as defined in any of claims 1–4.

* * * * *